US012767213B2

(12) United States Patent
Case Myers et al.

(10) Patent No.: US 12,767,213 B2
(45) Date of Patent: Oct. 20, 2026

(54) STEER-BY-WIRE ROAD WHEEL ACTUATOR MULTI-GROOVE BALL SCREW ANTI-ROTATION MECHANISM

(71) Applicant: Steering Solutions IP Holding Corporation, Saginaw, MI (US)

(72) Inventors: Christopher R. Case Myers, Freeland, MI (US); Caleb S. Palmer, Freeland, MI (US); Ryan D. Harris, Birch Run, MI (US); Eric D. Pattok, Frankenmuth, MI (US); Travis L. Palmer, Frankenmuth, MI (US); Bruce M. Collier, Saginaw, MI (US); Jason A. Dutsky, Bay City, MI (US); William S. Anders, Merril, MI (US); William R. Root, Clio, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 272 days.

(21) Appl. No.: 18/408,348

(22) Filed: Jan. 9, 2024

(65) Prior Publication Data

US 2024/0140523 A1 May 2, 2024

Related U.S. Application Data

(63) Continuation-in-part of application No. 18/457,594, filed on Aug. 29, 2023.

(Continued)

(51) Int. Cl.
*B62D 5/04* (2006.01)
*F16C 29/04* (2006.01)

(52) U.S. Cl.
CPC .......... *B62D 5/0448* (2013.01); *F16C 29/046* (2013.01); *B62D 5/0424* (2013.01); *B62D 5/0445* (2013.01); *F16C 2326/24* (2013.01)

(58) Field of Classification Search
CPC .. B62D 5/0448; B62D 5/0424; B62D 5/0445; F16C 29/046; F16C 2326/24
See application file for complete search history.

(56) References Cited

U.S. PATENT DOCUMENTS 1,921,122 A * 8/1933 Head ........................ B62D 3/08 74/499
2,770,155 A * 11/1956 Morgan .............. F16H 25/2233 269/189

(Continued)

FOREIGN PATENT DOCUMENTS

CN 120288116 A 7/2025

OTHER PUBLICATIONS

First Office Action and Search Report regarding corresponding CN App. No. 202410041994.5; dated Aug. 19, 2026.

*Primary Examiner* — Timothy Wilhelm
(74) *Attorney, Agent, or Firm* — Dickinson Wright PLLC

(57) ABSTRACT

A steer-by-wire steering system for a vehicle includes a bar extending from a first end to a second end, the bar defining a first groove and a second groove within an outer surface of the bar. The steer-by-wire steering system also includes an anti-rotation cartridge comprising a sleeve containing separate wear plates in which a plurality of ball bearings roll, wherein a first end of the sleeve contains a sleeve groove and window features, the inner surface of the sleeve containing V-shaped grooves in which the wear plates are disposed.

8 Claims, 14 Drawing Sheets

Related U.S. Application Data

(60) Provisional application No. 63/438,158, filed on Jan. 10, 2023, provisional application No. 63/429,517, filed on Dec. 1, 2022, provisional application No. 63/417,223, filed on Oct. 18, 2022, provisional application No. 63/402,620, filed on Aug. 31, 2022.

(56) References Cited

U.S. PATENT DOCUMENTS

| | | | | | |
|---|---|---|---|---|---|
| 3,074,735 | A * | 1/1963 | Ulrich | B62D 7/00 | 280/93.514 |
| 3,202,008 | A * | 8/1965 | Geyer | F16H 25/2015 | 74/89.37 |
| 3,218,937 | A * | 11/1965 | Dettlof | B62D 5/24 | 92/33 |
| 3,398,484 | A * | 8/1968 | Katsumura | E05F 15/622 | 49/281 |
| 3,399,581 | A * | 9/1968 | Valenti | F16H 25/2214 | 74/424.86 |
| 3,580,098 | A * | 5/1971 | Goad | F16H 25/2223 | 74/424.87 |
| 3,729,239 | A * | 4/1973 | Camosso | F16C 33/4623 | 384/575 |
| 4,258,584 | A * | 3/1981 | Haegele | F16H 25/2228 | 74/424.85 |
| 4,375,770 | A * | 3/1983 | Druet | F16H 25/2252 | 74/424.92 |
| 5,127,281 | A * | 7/1992 | Yanawgisawa | F16H 25/2018 | 74/89.38 |
| 5,178,030 | A * | 1/1993 | Bousquet | F15B 15/068 | 74/99 A |
| 5,341,701 | A * | 8/1994 | Krom | B62D 3/08 | 74/499 |
| 5,456,330 | A * | 10/1995 | Kojima | B62D 7/148 | 74/424.89 |
| 5,472,065 | A * | 12/1995 | Vergin | E05B 81/25 | 292/201 |
| 5,584,765 | A * | 12/1996 | Ochiai | F16D 3/065 | 464/168 |
| 5,803,202 | A * | 9/1998 | Bohner | B62D 5/005 | 180/443 |
| 6,116,109 | A * | 9/2000 | Zernickel | F16H 25/2214 | 74/424.9 |
| 6,343,993 | B1 * | 2/2002 | Duval | F16D 3/065 | 384/49 |
| 6,350,203 | B1 * | 2/2002 | Zernickel | F16C 3/035 | 464/167 |
| 6,374,693 | B1 * | 4/2002 | Kawabe | B62D 3/06 | 180/443 |
| 6,422,334 | B1 | 7/2002 | Cole | | |
| 6,439,072 | B1 * | 8/2002 | Kajita | F16H 25/2223 | 74/89.32 |
| 6,439,338 | B2 * | 8/2002 | Yoshioka | B62D 5/0448 | 180/444 |
| 6,761,503 | B2 * | 7/2004 | Breese | F16C 3/035 | 384/49 |
| 6,896,089 | B2 * | 5/2005 | Mills | B62D 5/001 | 180/402 |
| 6,921,338 | B2 * | 7/2005 | Cermak | F16D 3/065 | 464/167 |
| 7,322,607 | B2 * | 1/2008 | Yamada | F16C 33/58 | 280/755 |
| 7,481,130 | B2 * | 1/2009 | Yamada | B62D 1/185 | 280/775 |
| 7,562,594 | B2 * | 7/2009 | Nagai | F16H 25/2015 | 188/134 |
| 8,157,659 | B2 * | 4/2012 | Kakutani | F16C 3/035 | 464/167 |
| 8,671,789 | B2 * | 3/2014 | Osterlaenger | F16H 25/2233 | 74/89.42 |
| 8,925,938 | B2 * | 1/2015 | Yamanaka | B62D 5/0448 | 280/93.514 |
| 8,931,805 | B2 * | 1/2015 | Buzzard | F16D 3/065 | 280/775 |
| 9,273,766 | B2 * | 3/2016 | Shimizu | H02K 11/215 | |
| 9,409,592 | B2 * | 8/2016 | Pfeiffer | B62D 5/005 | |
| 9,744,988 | B2 * | 8/2017 | Nitano | B62D 3/08 | |
| 9,802,641 | B2 * | 10/2017 | Tomikawa | B62D 5/0448 | |
| 9,803,684 | B2 * | 10/2017 | Ryne | F16C 29/046 | |
| 10,197,090 | B2 * | 2/2019 | Daenzer | F16C 3/035 | |
| 10,330,141 | B2 * | 6/2019 | Kurokawa | F16C 3/035 | |
| 10,717,459 | B2 * | 7/2020 | Kurokawa | F16D 3/065 | |
| 10,895,278 | B2 * | 1/2021 | Kim | F16B 39/124 | |
| 11,098,790 | B2 * | 8/2021 | Castell | F16H 25/2228 | |
| 11,204,082 | B2 * | 12/2021 | Bonkowski | B62D 5/001 | |
| 11,554,807 | B2 * | 1/2023 | Kondo | B62D 3/08 | |
| 11,745,788 | B2 * | 9/2023 | Shin | F16H 25/2015 | 180/402 |
| 11,807,312 | B2 * | 11/2023 | Kitamura | F16H 25/2214 | |
| 11,939,008 | B2 * | 3/2024 | Ko | B62D 5/0445 | |
| 12,024,238 | B2 * | 7/2024 | Jordan | B62D 5/001 | |
| 12,037,056 | B2 * | 7/2024 | Kim | B62D 5/0445 | |
| 12,146,552 | B2 * | 11/2024 | Watanabe | F16H 25/2015 | |
| 12,187,361 | B2 * | 1/2025 | Shin | B62D 5/0424 | |
| 12,203,532 | B2 * | 1/2025 | Gitnes | F16H 25/2015 | |
| 12,233,962 | B2 * | 2/2025 | Cimatti | B62D 5/001 | |
| 12,409,881 | B2 * | 9/2025 | Park | B62D 5/006 | |
| 2010/0319472 | A1 * | 12/2010 | Wei | F16H 25/2021 | 74/89.37 |
| 2014/0349772 | A1 * | 11/2014 | Daenzer | F16C 3/035 | 29/434 |
| 2015/0329138 | A1 * | 11/2015 | Peterreins | B62D 3/08 | 74/424.75 |
| 2016/0223058 | A1 * | 8/2016 | Hsieh | F16H 25/2223 | |
| 2016/0369835 | A1 * | 12/2016 | Kurokawa | B62D 1/185 | |
| 2018/0238377 | A1 * | 8/2018 | Kim | B62D 6/10 | |
| 2019/0009814 | A1 * | 1/2019 | Ohashi | F16H 25/2204 | |
| 2019/0329816 | A1 * | 10/2019 | Ko | B62D 5/0424 | |
| 2020/0070871 | A1 * | 3/2020 | Du | B62D 15/0215 | |
| 2020/0369314 | A1 * | 11/2020 | Kitamura | B62D 5/0448 | |
| 2021/0394818 | A1 * | 12/2021 | Zinnecker | B62D 3/08 | |
| 2022/0111886 | A1 * | 4/2022 | Han | B62D 5/0448 | |
| 2023/0011733 | A1 * | 1/2023 | Park | B62D 5/0448 | |
| 2023/0026718 | A1 * | 1/2023 | Major | B62D 5/001 | |
| 2023/0294757 | A1 * | 9/2023 | Shin | B62D 5/0424 | |
| 2023/0399045 | A1 * | 12/2023 | Lee | B62D 3/08 | |
| 2024/0067255 | A1 | 2/2024 | Case Myers et al. | | |
| 2024/0116563 | A1 * | 4/2024 | Schoon | B62D 5/0448 | |
| 2024/0140523 | A1 * | 5/2024 | Case Myers | B62D 5/0445 | |
| 2025/0121873 | A1 * | 4/2025 | Ruh | B62D 5/001 | |
| 2025/0326425 | A1 * | 10/2025 | Feng | B62D 5/005 | |

* cited by examiner

STEER-BY-WIRE ROAD WHEEL ACTUATOR MULTI-GROOVE BALL SCREW ANTI-ROTATION MECHANISM

CROSS-REFERENCE TO RELATED APPLICATIONS

This application claims the benefits of priority to U.S. Provisional Application Ser. No. 63/438,158, filed Jan. 10, 2023, and is a continuation-in-part of U.S. patent application Ser. No. 18/457,594, filed Aug. 29, 2023, which claims the benefits of priority to U.S. Provisional Application Ser. No. 63/402,620, filed Aug. 31, 2022, U.S. Provisional Application Ser. No. 63/417,223, filed Oct. 18, 2022, and U.S. Provisional Application Ser. No. 63/429,517, filed Dec. 1, 2022, the disclosures of which are each incorporated by reference herein in their entireties.

FIELD OF THE INVENTION

The disclosure of this application relates to electric power steering (EPS) systems and, more particularly, to a road wheel actuator anti-rotation mechanism for such EPS systems.

BACKGROUND

Various electric power steering systems have been developed for assisting an operator with vehicle steering. One type of EPS system is referred to as a rack electric power steering (REPS) system. Some examples of steer-by-wire (SbW) road wheel actuators (RWAs) are simply ball screw based rack electric power steering systems without input shafts. In this configuration, a pinion gear shaft still engages rack teeth cut into the ball screw rack bar. This gear mesh provides two primary functions. First, a convenient rotating member for ball screw position sensing is provided. Second, an anti-rotation feature to prevent spinning of the ball screw occurs. If a steer-by-wire road wheel actuator is designed for a large vehicle, it may require the use of two ball nuts on the same ball screw to achieve the required output force. The addition of a rack and pinion mesh to this type of system would lead to an over-constraint condition since the center of the ball circuits in each ball nut defines the axis of the ball screw. The over-constraint is undesirable since it will lead to friction variation if parts are out of alignment.

As ball screw actuated steer-by-wire road wheel actuator systems evolve, these systems may move away from the traditional rack and pinion gear design since the gear mesh is no longer required to receive driver inputs from the handwheel.

Prior designs are very complex and require many high precision surfaces to function correctly. In addition to the complexity of its design, the system takes up a significant amount of packaging space in the vehicle due to the presence of the pinion tower and rack bearing axis.

SUMMARY

According to one aspect of the disclosure, a steer-by-wire steering system for a vehicle includes a bar extending from a first end to a second end, the bar defining a first groove and a second groove within an outer surface of the bar. The steer-by-wire steering system also includes an anti-rotation cartridge comprising a sleeve containing separate wear plates in which a plurality of ball bearings roll, wherein a first end of the sleeve contains a sleeve groove and window features, the inner surface of the sleeve containing V-shaped grooves in which the wear plates are disposed.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Referring now to the Figures, the embodiments described herein are used in conjunction with a steering assembly of a vehicle, such as a car, truck, sport utility vehicle, crossover, mini-van, marine craft, aircraft, all-terrain vehicle, recreational vehicle, or other suitable vehicles. As discussed herein, an electric power steering (EPS) system, including a steer-by-wire system, for example, includes an anti-rotation device where a pinion is not used in the steering system. The anti-rotation device resists rotation of a ball screw, rack or the like. Such rotation is induced by the loading of the threading of a ball nut.

As used herein, the terms screw, ball screw, and rack define a longitudinal member which is translated upon rotation of another member, such as a ball nut, for example. It is to be understood that the components may be used in various embodiments of the disclosure and are not limiting of other components which may be translated to carry out steering maneuvers.

Figure 1:
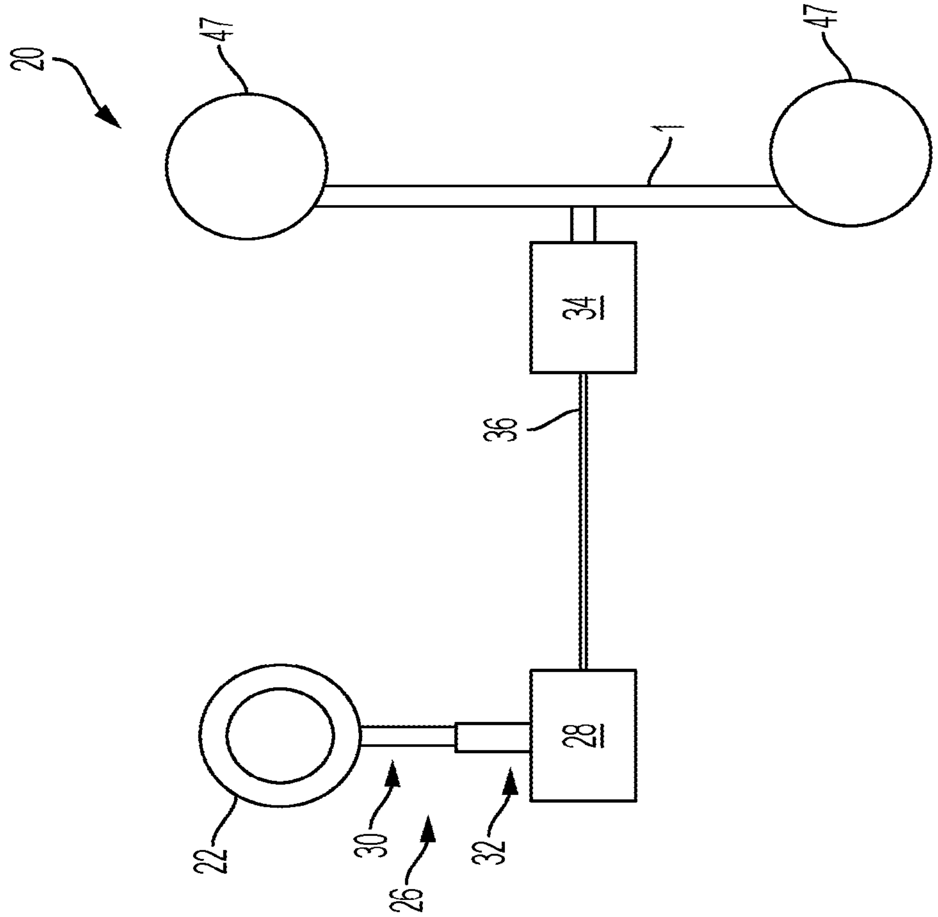
FIG. 1 illustrates a steering assembly with a rack electric power steering system.

Referring initially to FIG. 1, a power steering system 20 is generally illustrated schematically. The power steering system 20 may be configured as a driver interface steering system, an autonomous driving system, or a system that allows for both driver interface and autonomous steering. The steering system 20 may include an input device 22, such as a steering wheel, wherein a driver may mechanically provide a steering input by turning the steering wheel. A steering column 26 extends along an axis from the input device 22 to an output assembly 28. The steering column 26 may include two or more axially and/or rake adjustable parts, such as a first portion 30 and a second portion 32 which are axially adjustable with respect to one another. However, only a single portion may be present in some embodiments. The embodiments disclosed herein are utilized in steering systems where the output assembly 28 is in operative communication with an actuator 34 that is coupled to a rack, such as a ball screw rack 1 having a helical screw/linear rack configuration. The output assembly 28 is in operative communication, such as wired communication 36 (e.g., steer-by-wire configuration) with the actuator 34. Translation of the rack 1 adjusts the road wheels 47 for steering maneuvers.

Figure 2:
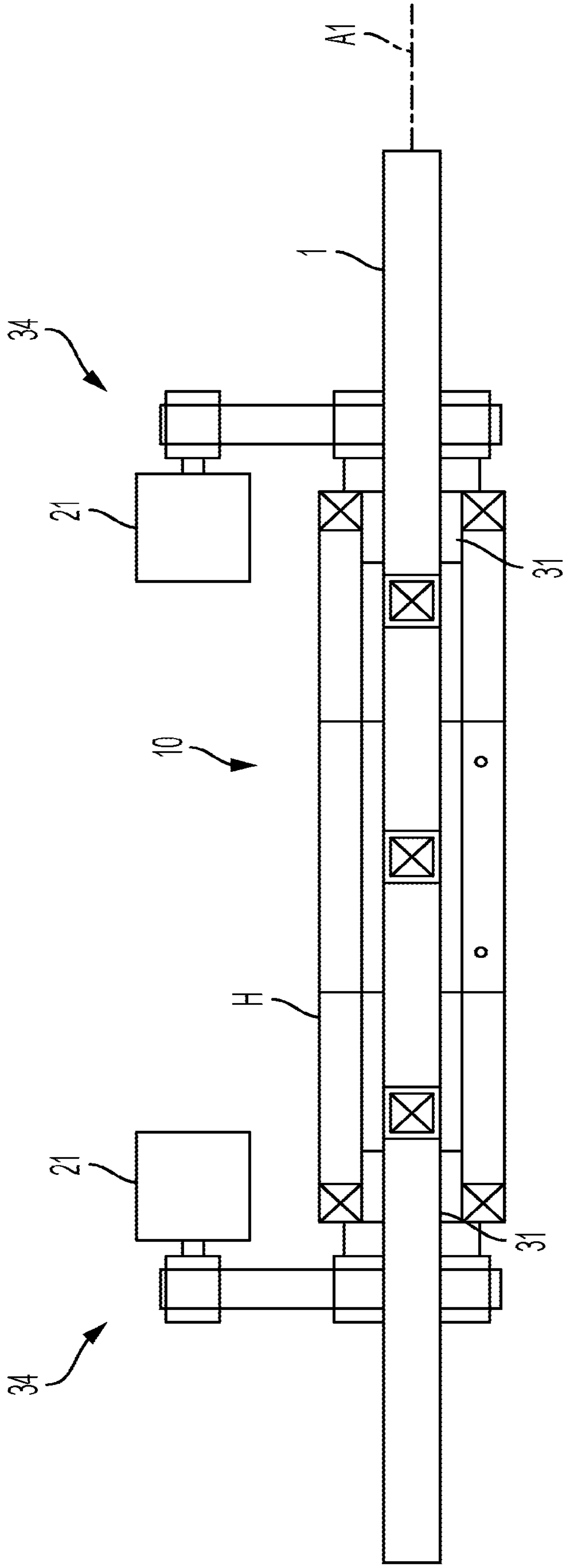
FIG. 2 schematically illustrates a dual motor rack electric power steering system.

As illustrated in FIG. 2, the rack 1 is translated with at least one actuator, and possibly two or more actuators 34, by way of example and without limitation. Each actuator 34 includes a motor 21 and a ball nut 31 configured to drive the rack 1 for translation along a rack axis A1. The rack 1 is surrounded radially by a housing, referenced with H.

Figure 4:
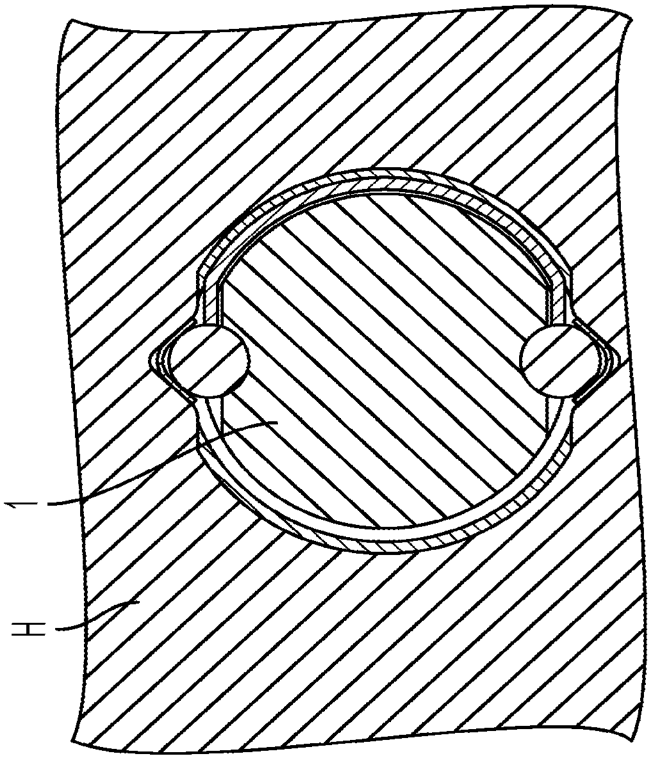
FIG. 4 is a cross-sectional view of the anti-rotation mechanism of FIG. 3.
Figure 3:
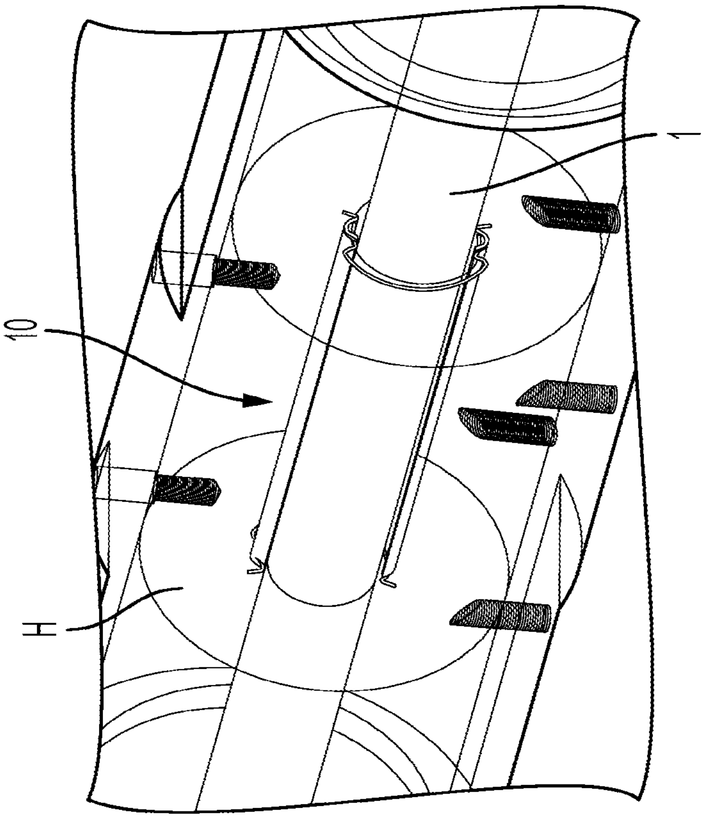
FIG. 3 is a perspective view of an anti-rotation mechanism for the rack electric power steering system disposed within a housing.

Referring now to FIGS. 3 and 4, the rack 1 and an embodiment of an anti-rotation mechanism 10 for the rack 1 are shown disposed within the housing H. The anti-rotation mechanism 10 resists rotation of the rack 1 during operation, as disclosed herein.

Figure 5A:
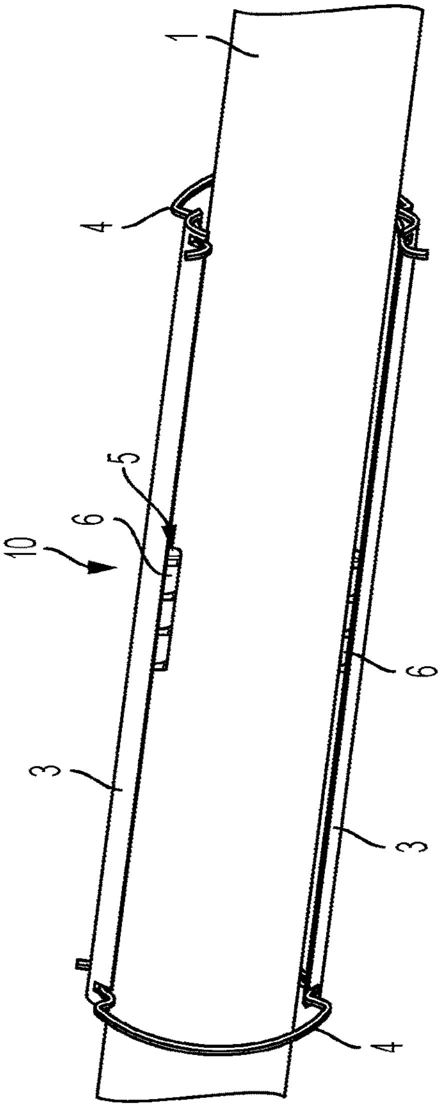
FIG. 5A is a perspective view of the anti-rotation mechanism according to one aspect of the disclosure.
Figure 5B:
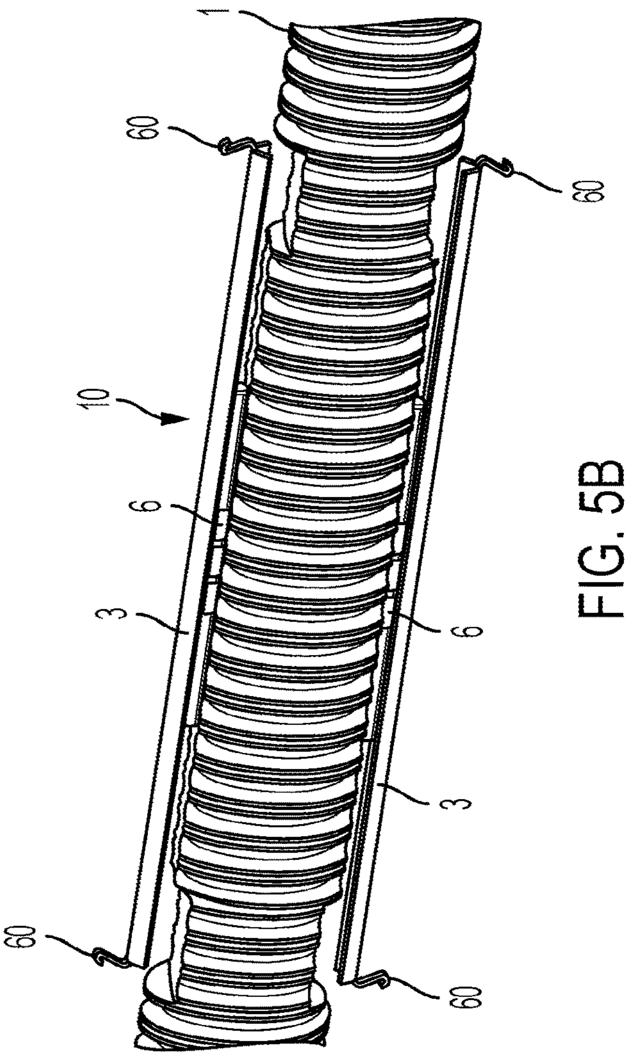
FIG. 5B is a perspective view of the anti-rotation mechanism according to another aspect of the disclosure.

FIGS. 5A and 5B illustrate views of an anti-rotation mechanism 10 in accordance with embodiments disclosed herein. The anti-rotation mechanism 10 includes a pair of running plates 3 positioned in a bore of the housing H. The running plates 3 may be formed of any suitable material, such as metal. For example, the running plates 3 are formed of steel in some embodiments. Although a pair of running plates 3 are shown, it is to be appreciated that more or less running plates 3 may be provided in some embodiments. Each running plate 3 has a plurality of balls 6 disposed between an inner surface of the running plate 3 and the rack 1. In particular, each set of balls 6 are positioned within a groove 5 defined along an outer surface of the rack 1. Each groove 5 extends in the longitudinal direction of the rack 1 to allow the rack 1 to translate relative to the anti-rotation mechanism 10 which remains relatively stationary within the housing H. The balls 6 react against the running plate 3 and the groove 5 of the rack 1.

The running plates 3 are retained in the assembly axially, radially and circumferentially by spring members 4 in the embodiment shown in FIG. 5A. In particular, the spring members 4 each include a pair of end legs which are fixed to the housing H. A connecting portion of the spring members 4 couples the running plates 3 to each other. In another embodiment, the retention of the running plates 3 is facilitated by snap fingers 60 which are located at end regions of each running plate 3, as shown in FIG. 5B. The snap fingers 60 are resilient members capable of deflecting to be inserted and retained within a retention feature of the housing H.

Figure 6:
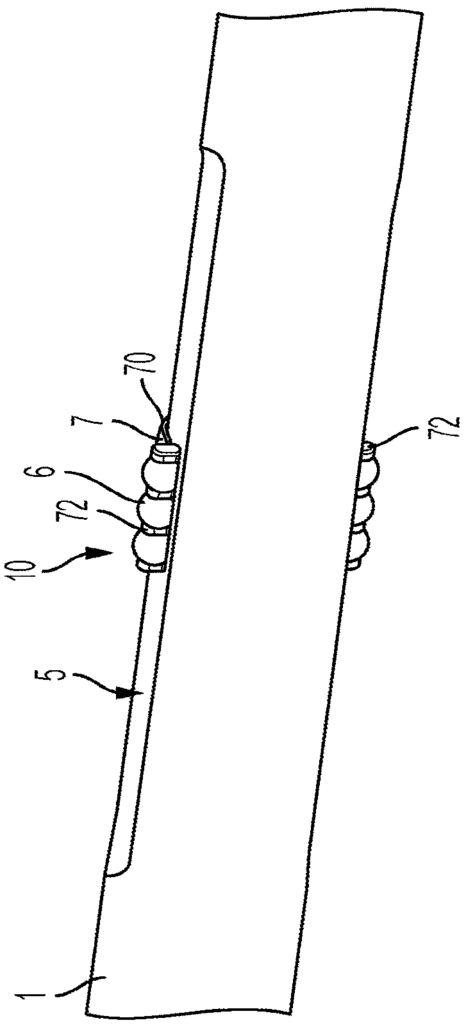
FIG. 6 is a perspective view of the anti-rotation mechanism according to another aspect of the disclosure.

Referring now to FIG. 6, the anti-rotation mechanism 10 includes a carrier 7 which retains the balls 6 in the anti-rotation mechanism 10 to ensure smooth movement and ease of the rack 1 relative to the anti-rotation mechanism 10. The carrier 7 includes a main portion 70 extending around a portion of the outer diameter of the rack 1. In some embodiments, the carrier 7 is substantially C-shaped and extends approximately 180 degrees around the outer surface of the rack 1. A plurality of fingers 72 are formed on the ends of the main portion 70. The plurality of fingers 72 are provided to at least partially retain the balls 6 within the anti-rotation mechanism 10. In particular, adjacent fingers of the plurality of fingers 72 contain a respective ball 6 therebetween.

Figure 7:
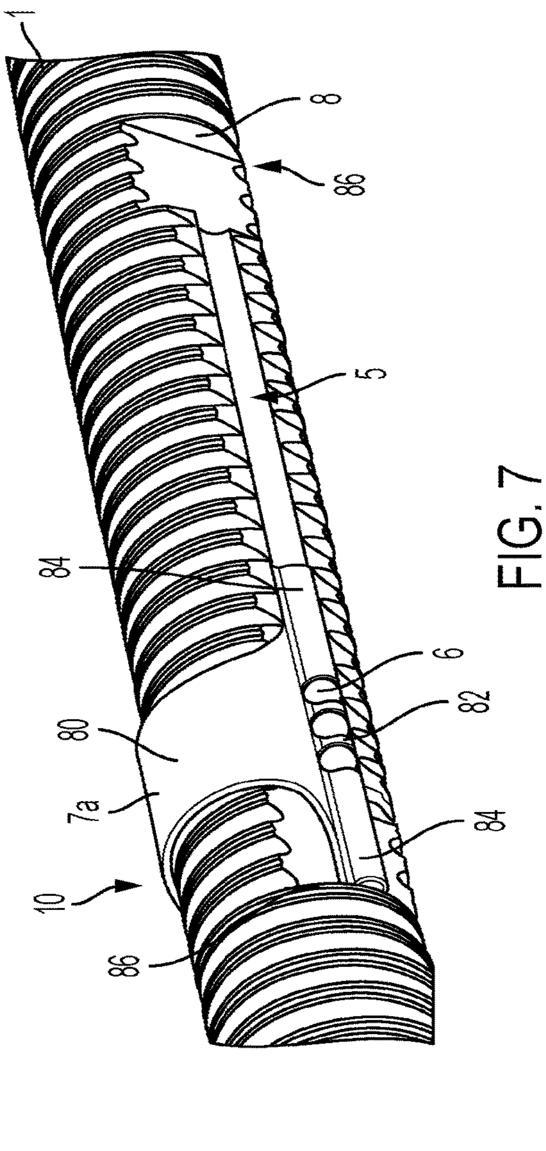
FIG. 7 is a perspective view of the anti-rotation mechanism according to another aspect of the disclosure.
Figure 8:
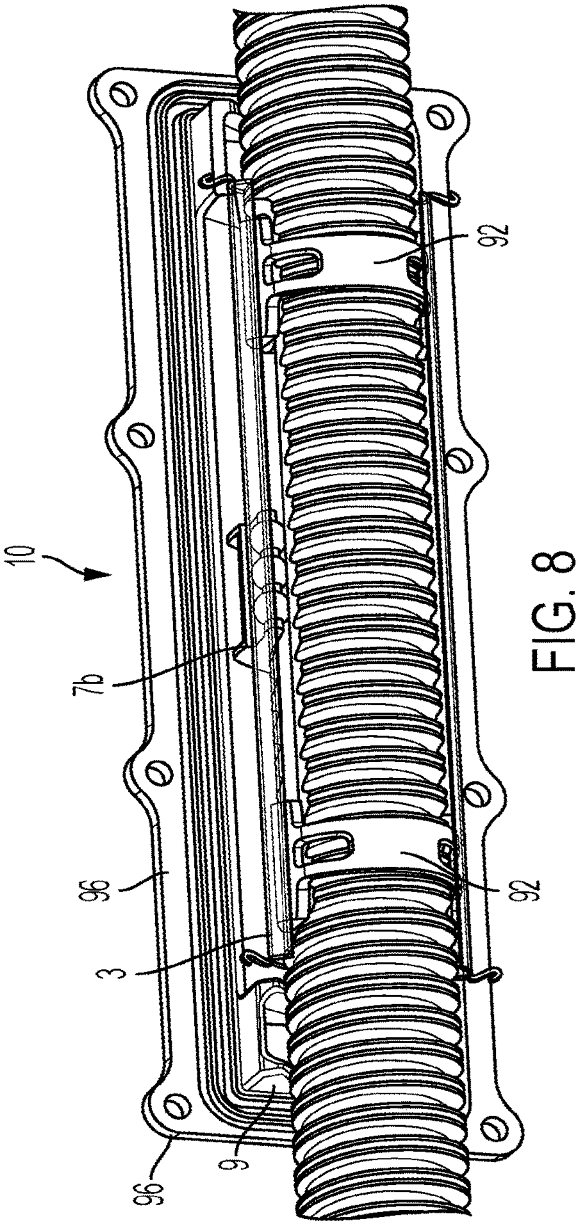
FIG. 8 is a perspective view of the anti-rotation mechanism according to another aspect of the disclosure.
Figure 9:
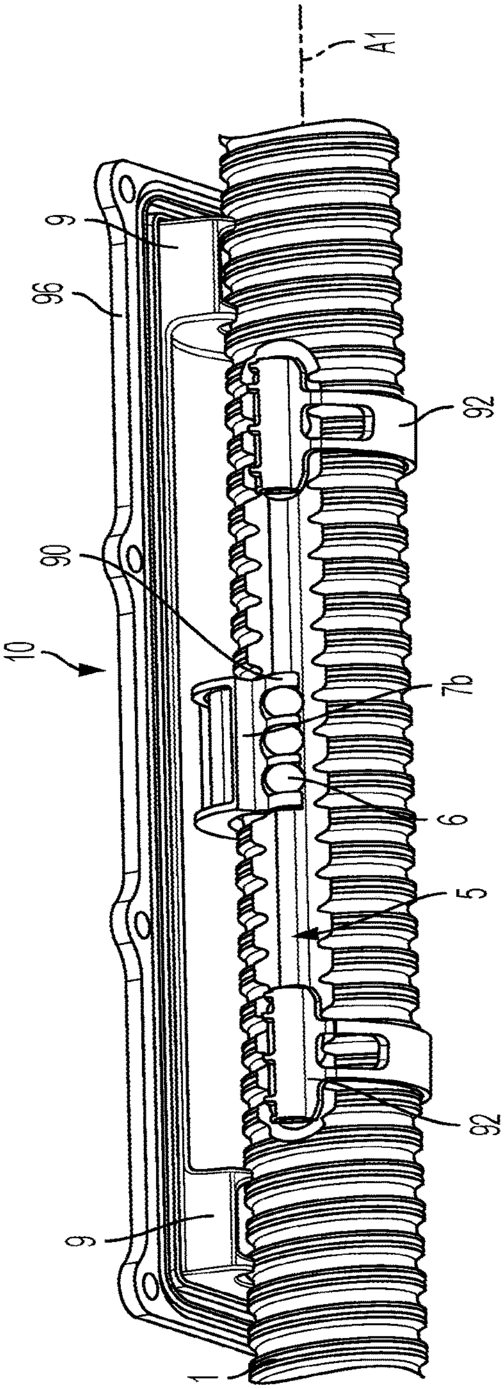
FIG. 9 is another perspective view of the anti-rotation mechanism of FIG. 8.
Figure 10:
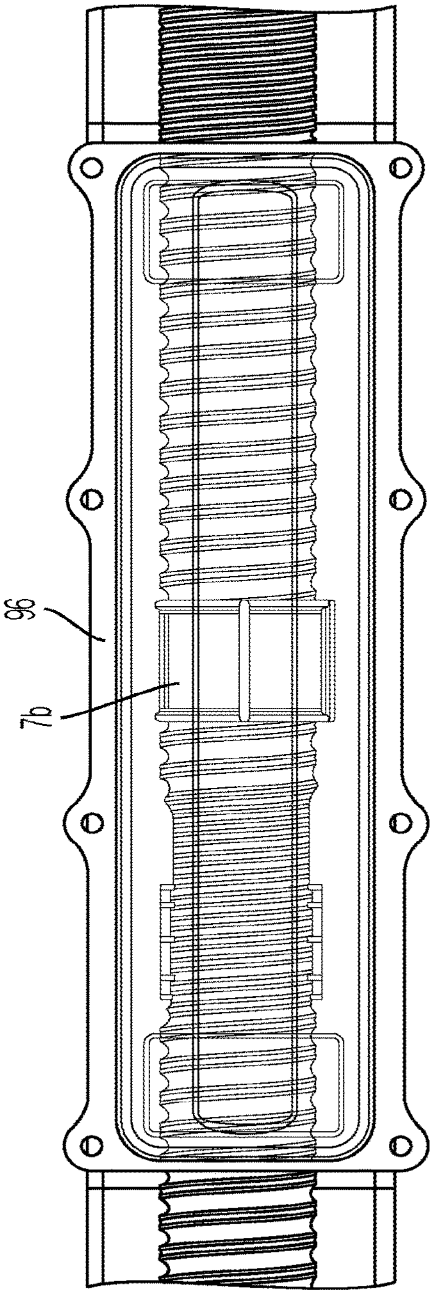
FIG. 10 is an elevation view of the anti-rotation mechanism of FIG. 8.
Figure 11:
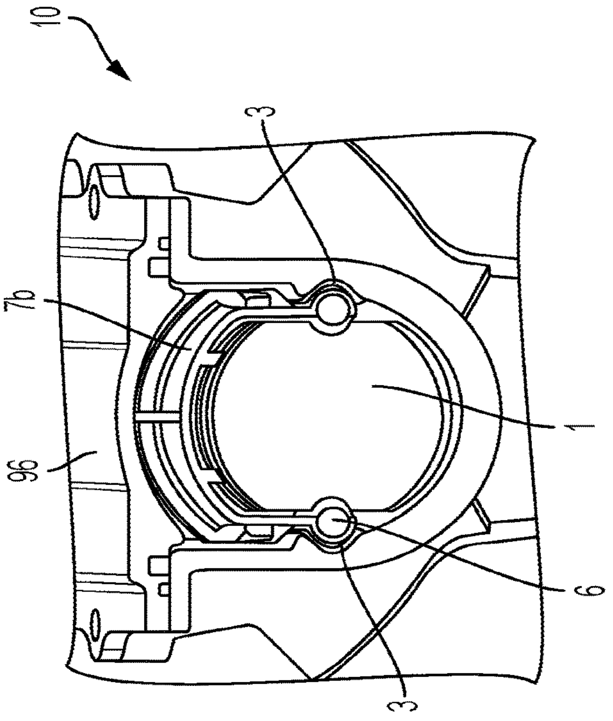
FIG. 11 is a section view of the anti-rotation mechanism of FIG. 8.

Referring to FIG. 7, another embodiment of the carrier is shown and referenced with 7*a*. The carrier 7*a* includes a main portion 80 extending around a portion of the outer diameter of the rack 1. In some embodiments, the carrier 7*a* is substantially C-shaped and extends approximately 180 degrees around the outer surface of the rack 1. A plurality of fingers 82 are formed on the ends of the main portion 80. The plurality of fingers 82 are provided to at least partially retain the balls 6 within the anti-rotation mechanism 10. In particular, adjacent fingers of the plurality of fingers 82 contain a respective ball 6 therebetween. The carrier 7*a* includes lateral edge regions 84 protruding in the axial direction of the rack 1 and away from the plurality of fingers 82. The lateral edge regions 84 provide added material on the ends of the carrier 7*a* to limit travel relative to the rack 1 based on the presence of a wall 86 created by at least one shoulder 8 defined at an end of the groove 5. For example, a machined flat surface on the rack 1 at an end of the groove 5 may be utilized as the travel limiter, but other structural features may be provided in other embodiments for interaction with the lateral edge regions 84.

Referring to FIGS. 8-11, another embodiment of the anti-rotation mechanism 10 is illustrated. The carrier in the illustrated embodiment is referenced with 7*b*, but may be similar or even identical to the carrier 7 discussed above. The carrier 7*b* is supported against rotation about the rack axis A1, and can be fixed relative to the housing H in some embodiments. The carrier 7*b* is shown as being generally C-shaped, having ball retainers in the form of a plurality of fingers 90 on diametrically opposite sides of the rack 1 for rolling receipt of the balls 6 therein and for rolling receipt of the balls 6 in the grooves 5 of the rack or screw 1 extending substantially parallel to the rack axis A1 along diametrically opposite sides of the rack 1. A travel limiting mechanism 92 is used to limit travel of the carrier 7*b* relative to the rack 1. The travel limiting mechanism 92 may be present in the form of a pair, with one of each disposed at the end of the grooves 5.

A cover 96 is used for the aid of assembling the anti-rotation mechanism 10 into the center of the housing H. A sealing joint (e.g., RTV, PIP Seal, etc.) may be provided along with fasteners (e.g., screws) to attach the cover 96 to the housing H. The cover 96 may also incorporate travel limiters 9, as required. The use of colored carriers 7*b* can be used for ease of identification of different ball sizes in some embodiments.

Regardless of which of the embodiments are utilized, when a torsional load is applied from the rack or screw 1, the load is transferred through the groove 5 to the balls 6 into the running plate 3 into the housing H, thereby preventing rotation of the rack or screw 1. The balls 6 allow low friction translation in an axial direction along the groove 5. The size of the balls 6 or the stiffness of the running plate 3 can be adjusted to accommodate a required compliance for noise and friction characteristics. The number of grooves 5 and number of balls 6 may also be adjusted based on the system requirements for friction and torque as well as to minimize over-constraint of the system.

The embodiments disclosed herein provide several structural features and benefits, including, but not limited to: a ball and groove mechanization to resist torque in a road wheel actuator steering system; steel running surface plates retained by the use of a spring member; balls being retained by a carrier for assembly and function; one or more groove and ball combinations to resist rotation torque by the internal or external member; a carrier that also functions as a travel limiter; a ball screw with a feature that helps limit the travel of the carrier similar to the mechanization shown using a shoulder, and a side cover for assembly of the mechanization and the incorporation of travel limiters attached or incorporated into the cover.

Figure 12:
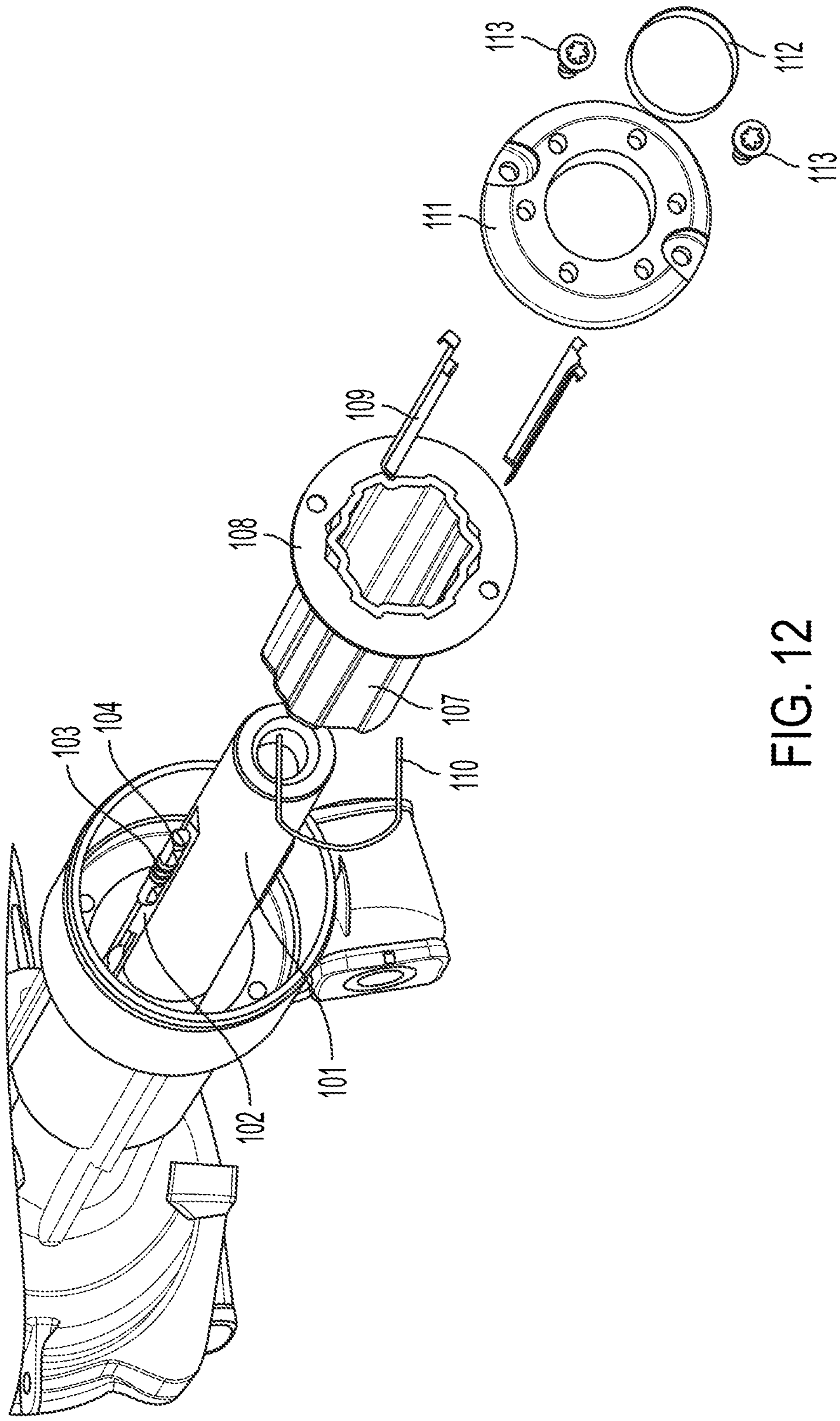
FIGS. 12-14 illustrate another embodiment of an anti-rotation mechanism.
Figure 13:
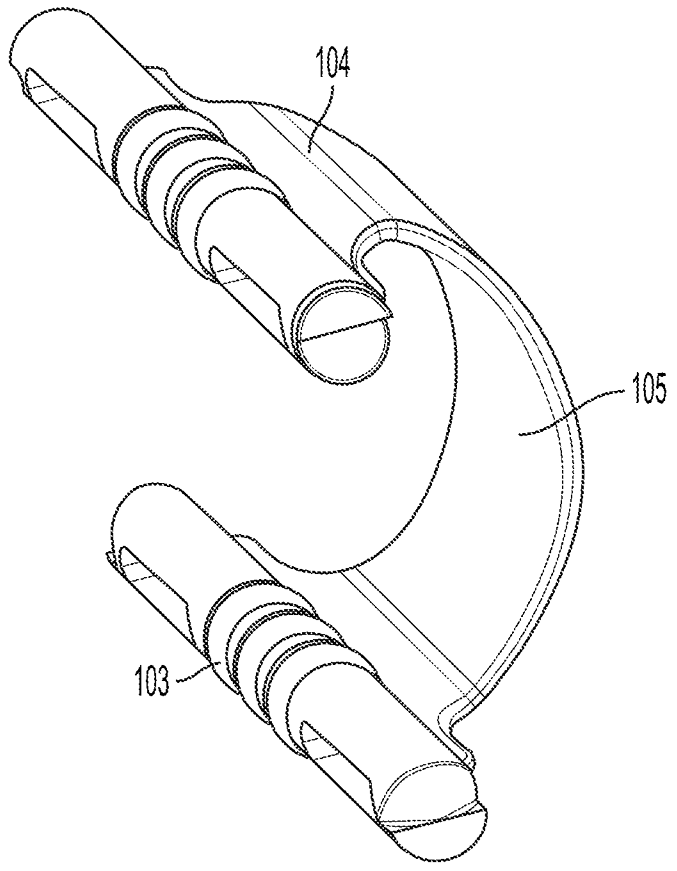
Figure 14:
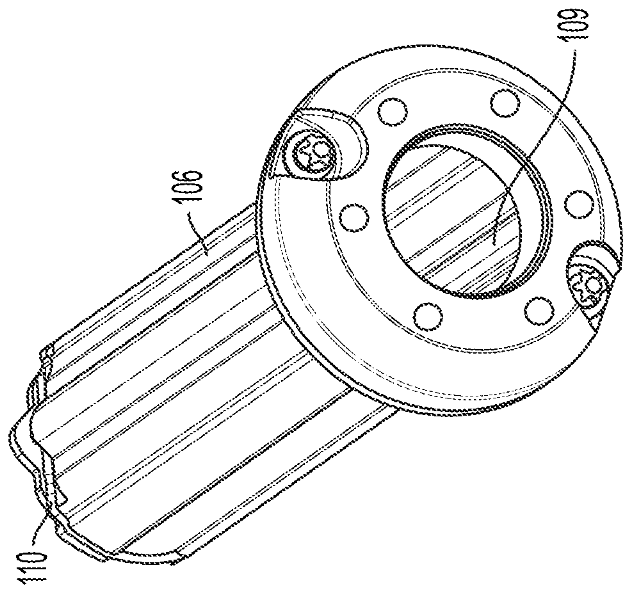

Referring now to FIGS. 12-14, a steel bar 101 with two grooves 102 machined into it on the end opposite the ball screw. The grooves 102 are opposite each other on the bar and are parallel with the axis of the bar. In the grooves 102 run a set of ball bearings 103 equally spaced by a ball carrier 104. The ball carrier 104 is C-shaped 105 such that it can assemble and snap into the grooves 102 from the side of the bar 101. The anti-rotation cartridge 106 includes a sleeve 107, a flange 108, two wear plates 109, a retaining clip 110, a travel stop 111, a radial support bushing 112, and a plurality of bolts 113. The sleeve 107 contains the wear plates 109 in which a plurality of ball bearings roll. The sleeve 107 at a first end contains a groove and window features, and the inner surface of the sleeve 107 contains V-shaped grooves in which the wear plates 9 are disposed.

Figure 15:
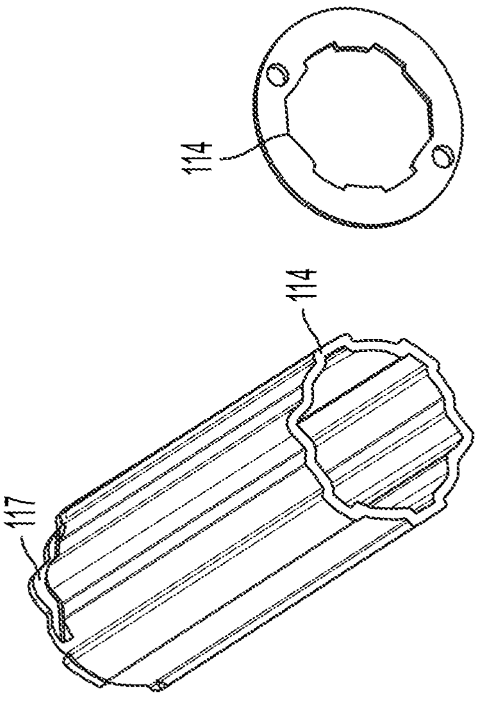
FIG. 15 illustrates a sleeve and flange of the anti-rotation mechanism as separate components operatively coupled together.
Figure 16:
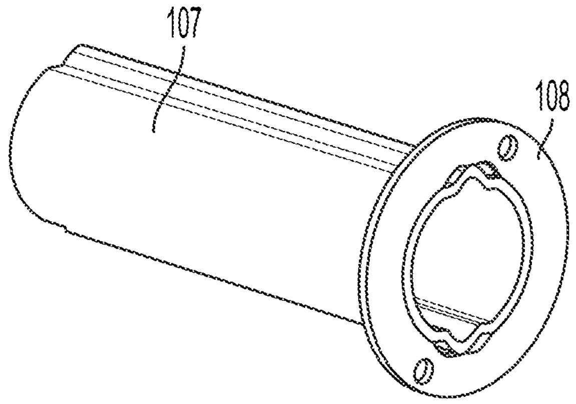
FIGS. 16 and 17 illustrate a sleeve and flange of the anti-rotation mechanism welded together.
Figure 17:
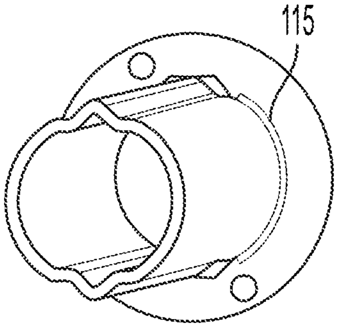
Figure 18:
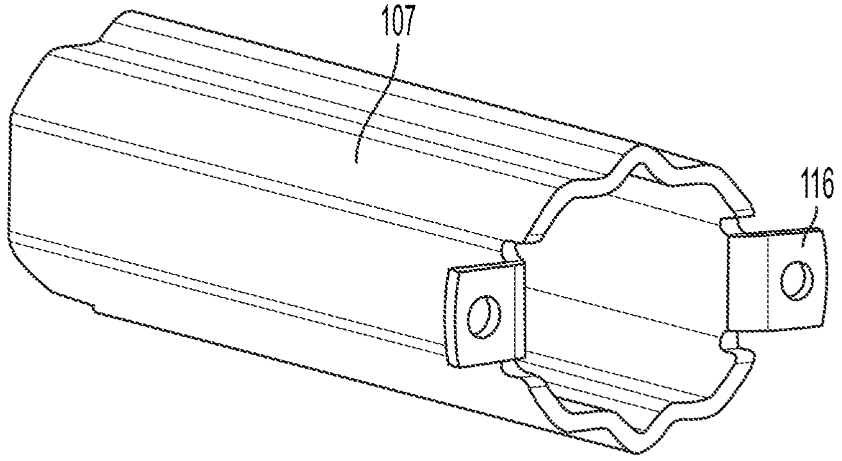
FIG. 18 illustrates a sleeve and bent tab of the anti-rotation mechanism.

Referring to FIG. 15, in the illustrated embodiment, the sleeve 107 and the flange 108 are separate steel pieces that have interlocking features 114 to permit the transmission of torque from the sleeve 107 to the flange 108. During assembly the flange 108 would be swaged onto the sleeve 107 as to lock it in place axially and permit a lash free joint. However, in some embodiments, the sleeve 107 is joined to the flange 108 via a welded joint 115, as shown in FIGS. 16 and 17. In other embodiments, the flange 108 is replaced by an integrated bent tab 116, as shown in FIG. 18.

Figure 19:
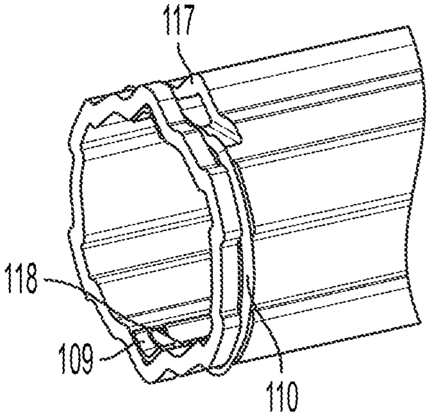
FIGS. 19 and 20 illustrate the sleeve according to another aspect of the disclosure.
Figure 20:
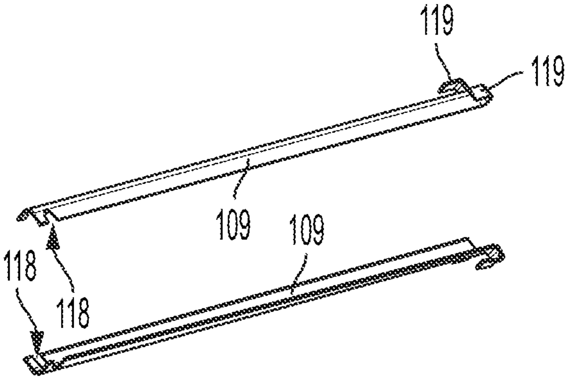

Referring to FIGS. 19 and 20, at one end of the sleeve 107 there is a window 117, which allows the retaining clip 110 to pass through the sleeve 107 and engage the slots 118 in the wear plates 109. The retaining clip 110 is formed such that it presses the wear plates 109 out radially in the sleeve to hold them in place during assembly. The wear plates 109 contain tabs 119 which slide over the end of the sleeve 107 to retain it both radially and axially during assembly.

Figure 21:
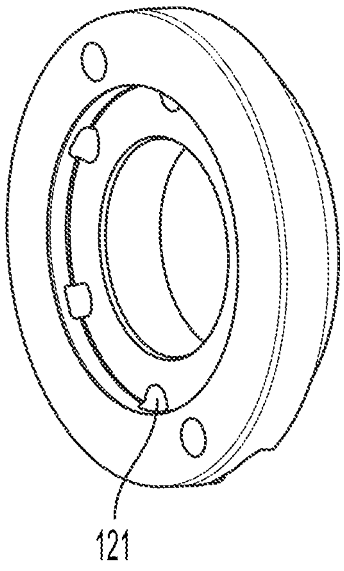
FIGS. 21 and 22 illustrate a travel stop of the anti-rotation mechanism according to an aspect of the disclosure.
Figure 22:
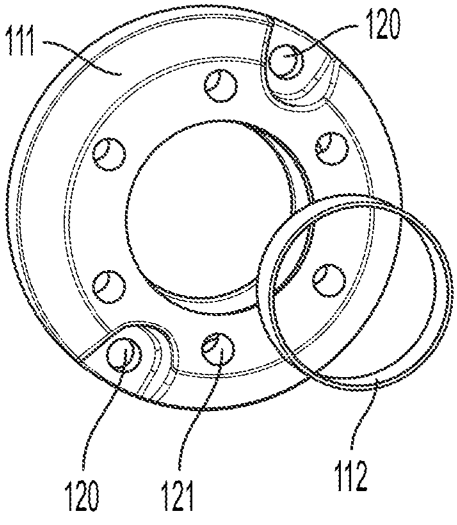

Referring now to FIGS. 21 and 22, the travel stop 111 contains a radial support bushing 112 that acts as the primary radial support of the steel bar 101 on this side of the steering system. The travel stop 111 may be designed such that the same bolts 113 that clamp the flange 108 to the housing may simultaneously clamp the travel stop 111 in place via through holes 120. Due to the close fit of the radial support bushing 112 to the steel bar 101, air passages 121 are formed in the travel stop to allow the flow of air from one side of the steering system to the other to prevent a pressure differential from forming inside the steering system.

The wear plates contain hook like features at a first end to retain the wear plates radially and axially to the sleeve. The wear plates contain slots at a second end—opposite the first end—to allow for engagement by a retaining clip. A retaining clip passes through the wear plate slots and the window features, with the retaining clip made from steel wire in some embodiments. The retaining clip acts as a biasing member to push the wear plates radially outward against the grooves in the sleeve. The retaining clip also engages the side of the sleeve window feature to provide axial retention of the wear plates to the sleeve. The sleeve has features such as a separate flange or integrated tabs with a hole pattern to allow fastening of the sleeve to the housing. The flange is made of steel in some embodiments and joined to the sleeve by either welding or swaging. If the sleeve is formed from steel then integrated tabs may be bent over perpendicular to the axis of the sleeve to provide the mounting surface. A travel stop is provided with an integrated radial support bushing and air passages to convey air from one side of the steering system to the other, conveyance of the air preventing high or low pressure conditions within the tie-rod boots during actuation of the steering system. The travel stop is made with a high pressure die-casting process out of aluminum or zinc in some embodiments. The travel stop is made with a powered metal process using iron in other embodiments. The radial support surface of the travel stop is made of a multi-layer bushing material or an injection molded plastic in some embodiments. The travel stop contains a hole pattern matching that of the flange or tabs such that the travel stop is fastened to the housing using the same bolts as what fastens the flange or tabs in some embodiments.

The embodiments disclosed herein are for REPS systems that have only a single ball nut instead of two or more. Also, the wear plates disclosed herein are housed in a cartridge sub-assembly that slides into the end of the housing and is bolted in place.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

What is claimed is:

1. A steer-by-wire steering system for a vehicle comprising:

a bar extending from a first end to a second end, the bar defining a first groove and a second groove within an outer surface of the bar; and anti-rotation cartridge comprising a sleeve containing separate wear plates in which a plurality of ball bearings roll; and a set of ball bearings spaced from each other by a ball carrier operatively coupled to the bar, wherein the ball carrier is C-shaped and has a first end and a second end, wherein the first end snaps into the first groove of the bar, wherein the second end snaps into the second groove of the bar.

2. The steer-by-wire steering system of claim 1, wherein the inner surface of the sleeve contains V-shaped grooves in which the wear plates are disposed.

3. The steer-by-wire steering system of claim 1, further comprising:

a flange mechanically fastened to the second end of the sleeve; and a travel stop ring operatively coupled to the flange.

4. The steer-by-wire steering system of claim 1, further comprising:

a flange welded to the second end of the sleeve; and a travel stop ring operatively coupled to the flange.

5. The steer-by-wire steering system of claim 1, further comprising;

a pair of bent tabs extending from the second end of the sleeve; and a travel stop ring operatively coupled to the pair of bent tabs.

6. The steer-by-wire steering system of claim 1, further comprising a travel stop operatively coupled to the sleeve, the travel stop containing a radial support bushing to radially support the bar.

7. The steer-by-wire steering system of claim 1, wherein the bar is formed of steel.

8. IA steer-by-wire steering system for a vehicle comprising:

a bar extending from a first end to a second end, the bar defining a first groove and a second groove within an outer surface of the bar; and anti-rotation cartridge comprising a sleeve containing separate wear plates in which a plurality of ball bearings roll, wherein a first end of the sleeve defines a sleeve groove and a window, wherein a retaining clip passes through the sleeve groove and the window of the sleeve to engage at least one slot in the wear plates.

* * * * *